(12) United States Patent
Wang Chen

(10) Patent No.: US 7,887,956 B2
(45) Date of Patent: Feb. 15, 2011

(54) AIR CATHODE HAVING MULTILAYER STRUCTURE AND MANUFACTURE METHOD THEREOF

(75) Inventor: Kuei Yung Wang Chen, Taipei (TW)

(73) Assignee: High Tech Battery Inc., Taipei (TW)

( * ) Notice: Subject to any disclaimer, the term of this patent is extended or adjusted under 35 U.S.C. 154(b) by 738 days.

(21) Appl. No.: 11/976,221

(22) Filed: Oct. 23, 2007

(65) Prior Publication Data

US 2008/0044640 A1 Feb. 21, 2008

Related U.S. Application Data

(63) Continuation-in-part of application No. 11/092,738, filed on Mar. 30, 2005, now abandoned.

(51) Int. Cl.
*H01M 4/96* (2006.01)
*H01M 4/88* (2006.01)

(52) U.S. Cl. .................................. 429/405; 429/406

(58) Field of Classification Search ............... None
See application file for complete search history.

(56) References Cited

U.S. PATENT DOCUMENTS

| | | | |
|---|---|---|---|
| 3,748,184 A | * | 7/1973 | Witherspoon ............... 502/101 |
| 5,531,883 A | * | 7/1996 | Cameron et al. ............ 205/626 |
| 6,103,077 A | * | 8/2000 | DeMarinis et al. ..... 204/290.07 |

\* cited by examiner

*Primary Examiner*—John S Maples
(74) *Attorney, Agent, or Firm*—Rosenberg, Klein & Lee

(57) ABSTRACT

An air cathode having a multilayer structure is composed of at least one substrate, two diffusion layers and three activation layers. The two diffusion layers are laminated over an upper side of the substrate and a lower side of the substrate. The three activation layers are respectively laminated over one of the two diffusion layers in order. Different loadings or different kinds of catalysts are added into a slurry to form the activation layers, and the activation layers and the diffusion layers are made through simultaneous sintering, thereby shortening the processing time. When the air cathode is used as the cathode of the Zinc-Air battery, the electrolyte inside the Zinc-Air battery will not be influenced by the outside air, and the problem of maintaining the water content of the zinc anode of the Zinc-Air battery can be efficiently overcome.

7 Claims, 5 Drawing Sheets

AIR CATHODE HAVING MULTILAYER STRUCTURE AND MANUFACTURE METHOD THEREOF

REFERENCE TO RELATED APPLICATION

This patent application is being filed as a Continuation-in-Part of patent application Ser. No. 11/092,738, filed Mar. 30, 2005, now abandoned.

FIELD OF THE INVENTION

The present invention relates to an air cathode composed of a multilayer structure and its manufacture method, and more particularly to a new electrode structure that is taken as a cathode of a Zinc-Air battery and prevents the electrolyte inside the Zinc-Air battery from being influenced by the outside air.

BACKGROUND OF THE PRESENT INVENTION

A Zinc-Air battery which takes oxygen molecules in the air as the cathode reactant has been considered as the substitute for an alkaline battery due to its features of high specific energy and outputting stable discharge voltages. Moreover, the application including the battery for an automobile, a hearing aid can also utilizes the Zinc-Air battery as a power supply device to increase the advantages of environmental protection and low price.

Since the type of the Zinc-Air battery uses zinc metal as an anode and oxygen in the air ($O_2$) as a cathode, the cathode of the Zinc-Air battery is so called the air cathode. Potassium hydroxide (KOH) aqueous solution is taken as electrolyte inside the Zinc-Air battery. After the oxygen in the air undergoes the cathode chemical reaction to from hydroxyl ion (OH—), the zinc anode composed of the zinc mixture (zinc syrup, zinc plate or zinc foil) undergoes the oxygen reduction reaction to output stable discharge voltages. The chemical formula of the oxygen reduction reaction is listed as below:

Cathode: $H_2O + \frac{1}{2}O_2 + 2e^- \rightarrow 2OH^-$

Anode: $Zn + 2OH^- \rightarrow ZnO + H_2O + 2e^-$

Reaction: $Zn + \frac{1}{2}O_2 \rightarrow ZnO$

Since the air cathode of the Zinc-Air battery is only taken as the medium, its activity/mass may not be changed or used up. While manufacturing the Zinc-Air battery, the loading of the zinc anode of the Zinc-Air battery can be increased to increase the capacity and specific energy, thereby achieving the goal of miniaturizing the Zinc-Air battery.

However, this type of the Zinc-Air battery must be equipped with air holes to let air enter the battery. The housing of the Zinc-Air battery may not be sealed, and it must be made into the semi-open structure. The semi-open structure will influence the performances of the Zinc-Air battery and shorten the service life of the Zinc-Air battery since the Zinc-Air battery is easily influenced by air.

Further, the conventional air cathode structure utilized by the Zinc-Air battery employs the single layer structure that has a drawback of maintaining the water content of the zinc anode inside the battery for long period. If the outside air is at high humidity condition, water vapor may enter the inside of the Zinc-Air battery through the air cathode of the Zinc-Air battery, resulting in dilution of the electrolyte and reduction of the discharge voltage, and on the other if the outside air is at low humidity condition, the electrolyte inside the Zinc-Air battery may lose its water content through the air cathode. Consequently, the electrolyte may be run out and the battery may malfunction.

The conventional process for manufacturing the air cathode having the multilayer structure must sinter the multilayer structure composed of the diffusion layers and the substrate at high temperature after performing the pressing procedure to tighten the structure. The multilayer structure then is sintered again after catalyst layers are coated on the diffusion layers to cause inconvenience and high production cost.

SUMMARY OF THE PRESENT INVENTION

Accordingly, to overcome the foregoing problem, an objective of the present invention is to provide an air cathode composed of a multilayer structure that comprises at least one substrate, two diffusion layers and three activation layers. The two diffusion layers are laminated over an upper side and a lower side of the substrate. The three activation layers are laminated over one of the two diffusion layers in order. More specifically, different loadings or different kinds of catalysts can be added to the activation layers, and the activation layers and the diffusion layers are made through simultaneous sintering, thereby shortening the processing time. The air cathode can be applied to an electrode of a Zinc-Air battery, a fuel cell, or a capacitor. The two diffusion layers can be so called the multilayer insulation structure that efficiently slows down the passing through of water vapor. When the air cathode is used as the cathode of the Zinc-Air battery, the electrolyte inside the Zinc-Air battery will not be influenced by the outside air, and the problem of maintaining the water content of the zinc anode of the Zinc-Air battery can be efficiently overcome. The water content of the zinc anode of the Zinc-Air battery can be maintained over one month under the dry condition, thereby stably maintaining the performance of the Zinc-Air battery for a longer period.

To compare with the conventional air cathode, the current density of the conventional air electrode or the gas electrode can only achieve between −0.025 and −0.080 A/cm², and the current density of the conventional activation layer can only achieve about −0.3 A/cm². However, the current density of the air cathode in an embodiment of the present invention can achieve −0.34 A/cm², thereby providing higher current output.

Moreover, since the conventional air cathode (the three-layer structure composed of two diffusion layers and one activation layer) needs two-time sintering for 60 minutes, the air cathode (the five-layer structure composed of two diffusion layers and three activation layers) of the present invention only needs one time sintering for 30 minutes to save the production time.

Another objective of the present invention is to provide a method for manufacturing an air cathode. The method includes the following steps:

a). Providing at least one substrate;

b). Laminating two diffusion layers over an upper side of the substrate and a lower side of the substrate;

c). Adding different loadings or different kinds of catalysts into a slurry to form at least three activation layers;

d). Respectively laminating the three activation layers over one of the two diffusion layers in order; and e) simultaneously sintering the activation layers and the diffusion layers to shorten the processing time.

Since the three activation layers composed of the slurry are added with different loadings or different kinds of catalysts, higher discharge current is provided, and the performance may not easily lose while in discharging for a long time.

DETAILED DESCRIPTION OF THE PREFERRED EMBODIMENTS

Figure 1A:
FIG. 1A to FIG. 1E are schematic diagrams illustrating an air cathode of the present invention.
Figure 1B:
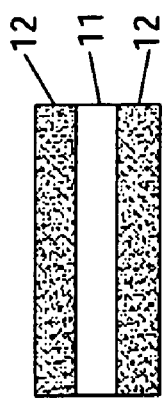
Figure 1C:
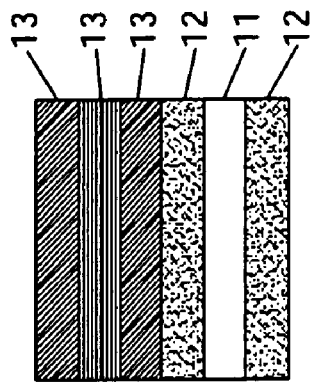
Figure 1D:
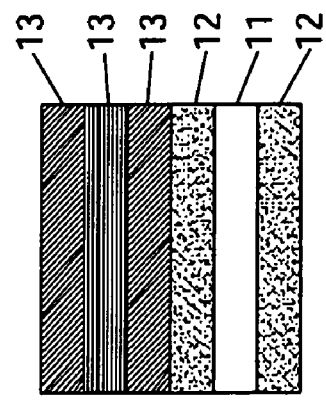
Figure 1E:
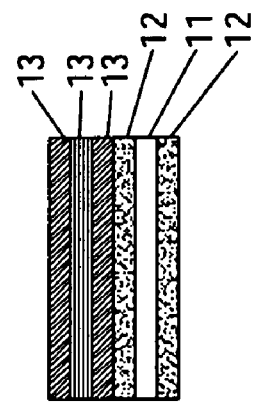

Referring FIG. 1A to FIG. 1E for the schematic diagrams illustrate an air cathode according to a preferred embodiment of the present invention. The air cathode 10 composed of a multiplayer structure can slow down the passing through of water vapor. The air cathode 10 includes at least one substrate 11, two diffusion layers 12 and at least three activation layers 13. The two diffusion layers 12 are laminated over an upper side of the substrate 11 and a lower side of the substrate 11. The three activation layers 13 are respectively laminated over one of the two diffusion layers 12 in order. The different loadings or different kinds of catalysts (not shown in the figure) are added into a slurry (not shown in the figure) to form the activation layers 13. The activation layers 13 and the diffusion layers 12 are made through simultaneous sintering, thereby shortening the processing time. The different loadings of catalysts are to change weights of catalysts coated on the air cathode 10, and the different kinds of catalysts are to coat different metal salts or meal oxide on the air cathode 10. Since $MnO_2$ (Manganese oxide) of 3 mg/cm$^2$ added to the single activation layer of the conventional air cathode may cause unstable electric property, the air cathode having the three activation layers illustrated in the embodiment can maintain stable discharge current by adding $MnO_2$ of 1 mg/cm$^2$, cobalt oxide (CoO) of 1 mg/cm$^2$, and $MnO_2$ of 1 mg/cm$^2$ respectively. The thickness of the air cathode 10 is preferably between 0.01 and 20 mm, and the density of the air cathode 10 is preferably between 0.01 and 5.0 g/cm$^3$. The air cathode 10 can be taken as an electrode of the Zinc-Air battery, the fuel cell or the capacitor.

The air cathode 10 of the present invention utilizes the substrate 11 as an electrical current collector. The substrate 11 is made of a metal mesh. Further, the metal mesh includes a metal wire mesh, a metal mesh grid or foam. The material of the metal mesh includes stainless steel, copper, nickel, copper alloy, nickel alloy, other metals or alloys.

Every diffusion layer 12 is composed of hydrophobic carbon material and PTFE (polytetrafluoroethylene) binder. The thickness of the diffusion layer 12 is preferably between 0.01 and 15 mm. When the air cathode 10 is taken as the cathode of the Zinc-Air battery, air can pass through the diffusion layers 12 of the air cathode 10, and the diffusion layers 12 can prevent electrolyte inside the Zinc-Air battery from being affected by the outside air. Moreover, the water content of the zinc anode of the Zinc-Air battery can be maintained for a longer period.

Every activation layer 13 laminated over the diffusion layer 12 is composed of hydrophilic carbon material, PTFE binder, and catalyst. When the air cathode 10 of the present invention is taken as the cathode of the Zinc-Air battery, the activation layer 13 of the air cathode 10 is utilized to activate oxygen to perform the cathode chemical reaction and converts it into hydroxyl ion that then passes through the electrolyte to react with the zinc anode metal, thereby generating electric current. The catalyst attached to the activation layer 13 can be selected from metal oxide or salt such as iron, cobalt, nickel and manganese, and other metals.

Figure 2:
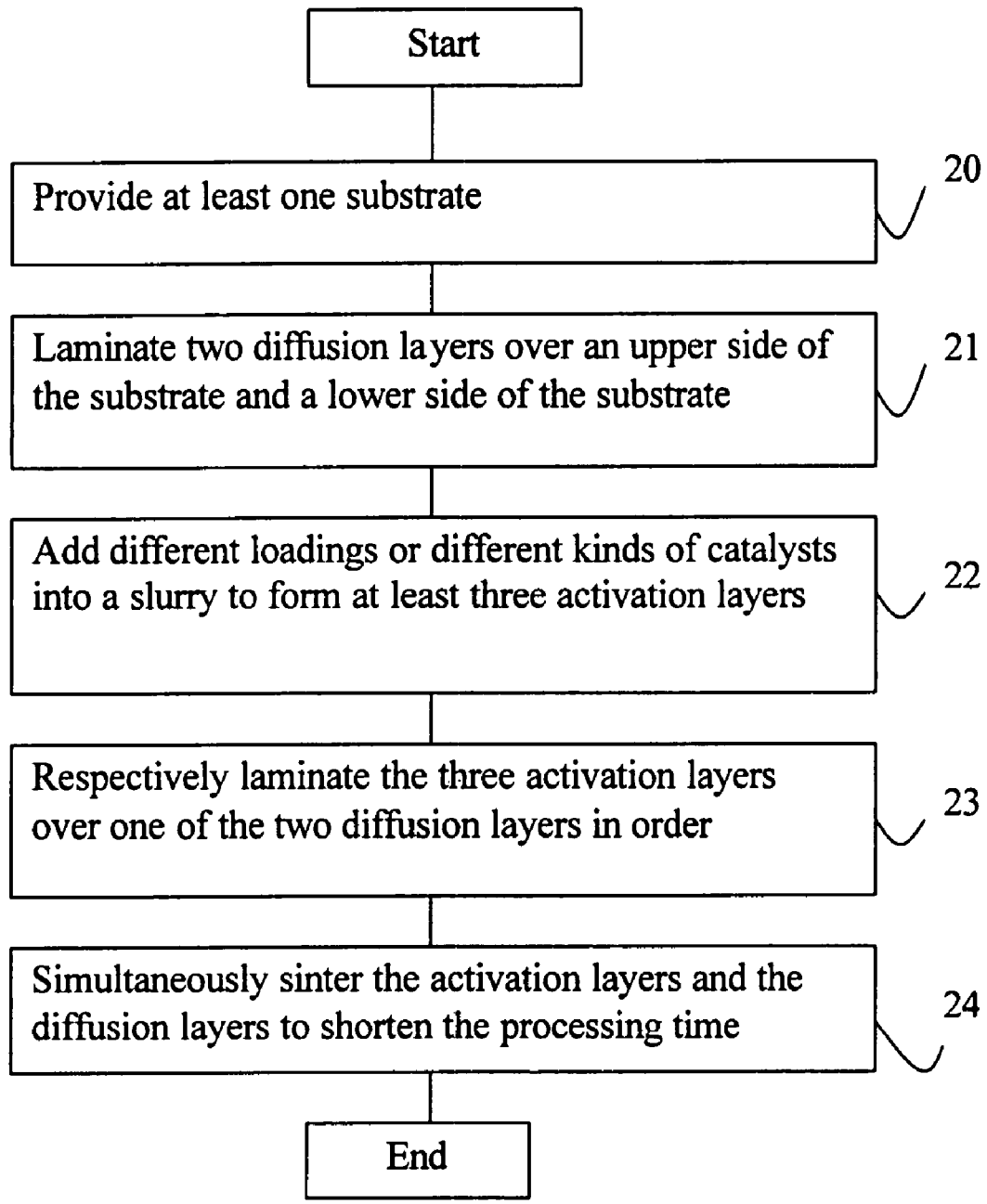
FIG. 2 is a flowchart illustrating a method for manufacturing an air cathode of the present invention.

Referring to FIG. 2 for the flowchart illustrates a method for manufacturing an air cathode according to an embodiment of the present invention. The method includes the following steps:

Step 20: provide at least one substrate;

Step 21: laminate two diffusion layers over an upper side of the substrate and a lower side of the substrate;

Step 22: add different loadings or different kinds of catalysts into a slurry to form at least three activation layers;

Step 23: respectively laminate the three activation layers over one of the two diffusion layers in order; and Step 24: simultaneously sinter the activation layers and the diffusion layers to shorten the processing time.

Figure 3:
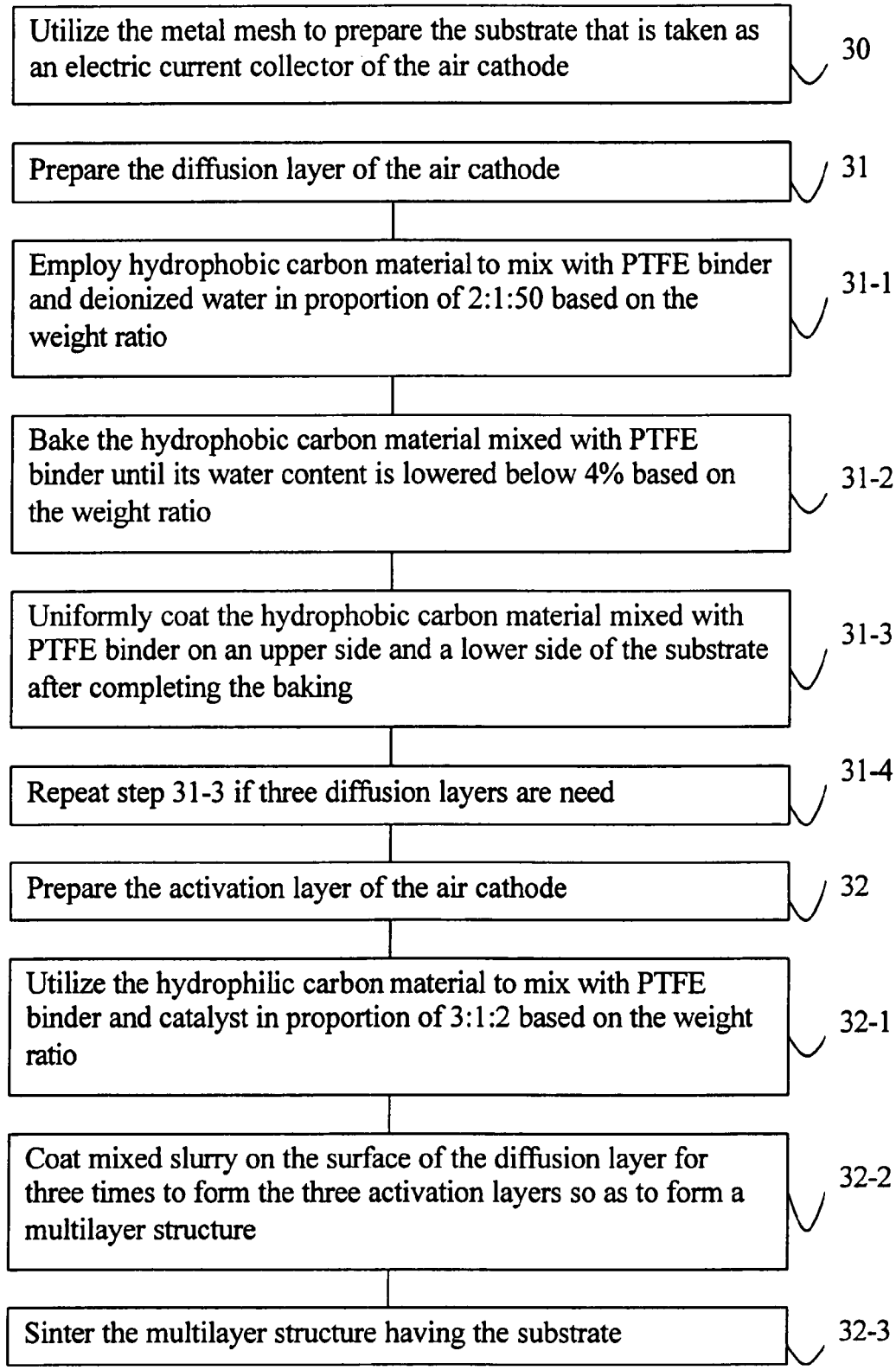
FIG. 3 is a flowchart illustrating a method for manufacturing an air cathode according to a preferred embodiment of the present invention.

Referring to FIG. 3 for a flowchart illustrates a method for manufacturing an air cathode according to a preferred embodiment of the present invention. The method further includes the following steps:

Step 30: Utilize the metal mesh to prepare the substrate that is taken as an electric current collector of the air cathode. The metal mesh includes a metal wire mesh, a metal mesh grid or foam net. The material of the metal mesh includes stainless steel, copper, nickel, copper alloy or nickel alloy.

Step 31: Prepare the diffusion layer of the air cathode.

Step 31-1: Employ hydrophobic carbon material to mix with PTFE binder and deionized water in proportion of 2:1:50 based on the weight ratio.

Step 31-2: Bake the hydrophobic carbon material mixed with PTFE binder until its water content is lowered below 4% based on the weight ratio.

Step 31-3: Uniformly coat the hydrophobic carbon material mixed with PTFE binder on an upper side and a lower side of the substrate after completing the baking.

Step 31-4: Repeat step 31-3 if three diffusion layers are need.

Step 32: Prepare the activation layer of the air cathode.

Step 32-1: Utilize the hydrophilic carbon material to mix with PTFE binder and catalyst in proportion of 3:1:2 based on the weight ratio, and water, methyl alcohol or isopropyl alcohol, which is 500 times (weight) more than hydrophilic carbon material, then is added as a solvent. The aforesaid materials are uniformly mixed to become mixed slurry, and the catalyst is preferably metal oxide or salts such as iron, cobalt, nickel, manganese, copper, and other materials.

Step 32-2: Coat mixed slurry on the surface of the diffusion layer for three times to form the three activation layers so as to form a multilayer structure.

Step 32-3: Sinter the multilayer structure having the substrate, the two diffusion layers and the three activation layers at high temperature of 200-400° C. for 10-40 minutes to enable the PTFE binder to be stabilized. Afterward a roller is provided for pressing the multilayer structure to adjust the thickness at 0.01-20 mm, thereby forming the air cathode having the laminated multilayer structure.

The air cathode 10 disclosed in a preferred embodiment utilizes a nickel foam to prepare the substrate 11 that is taken as the electric current collector for the air cathode 10. Each diffusion layer 12 is laminated over an upper and lower side of the nickel mesh, and three activation layers 13 are coated on a diffusion layer 12 laminated over the substrate 11. The thickness of the air cathode 10 is 1.0 mm, and the density of the air cathode 10 is 0.2 g/cm$^2$.

The method of manufacturing the diffusion layer 12 is that hydrophobic carbon material, the PTFE binder and deionized water are dried after mixing the aforesaid materials in proportion of 2:1:50 based on the weighted ratio. The mixed slurry then is coated to the upper side and the lower side of the nickel foam. The method of manufacturing the activation layer 13 is that hydrophilic carbon material, PTFE binder, manganese dioxide taken as catalysts are mixed in proportion of 3:1:2 based on the weight ratio. Methyl alcohol, isopropyl alcohol or deionized water, which is 500 times (weight) more than the hydrophilic carbon material, then is added to become mixed slurry. The mixed slurry then is coated on a surface of a diffusion layer 12 for three times to form the three activation layers 13, thereby forming a multilayer structure. The multilayer structure then is sintered at high temperature of 300° C. for 30 minutes to form the air cathode 10. The air cathode 10 in the embodiment is performed with air cathode IV electric property test Air Cathode IV Electric Property Test (Discharge Test of Electric Current Density Versus Electric Potential)

Figure 4:
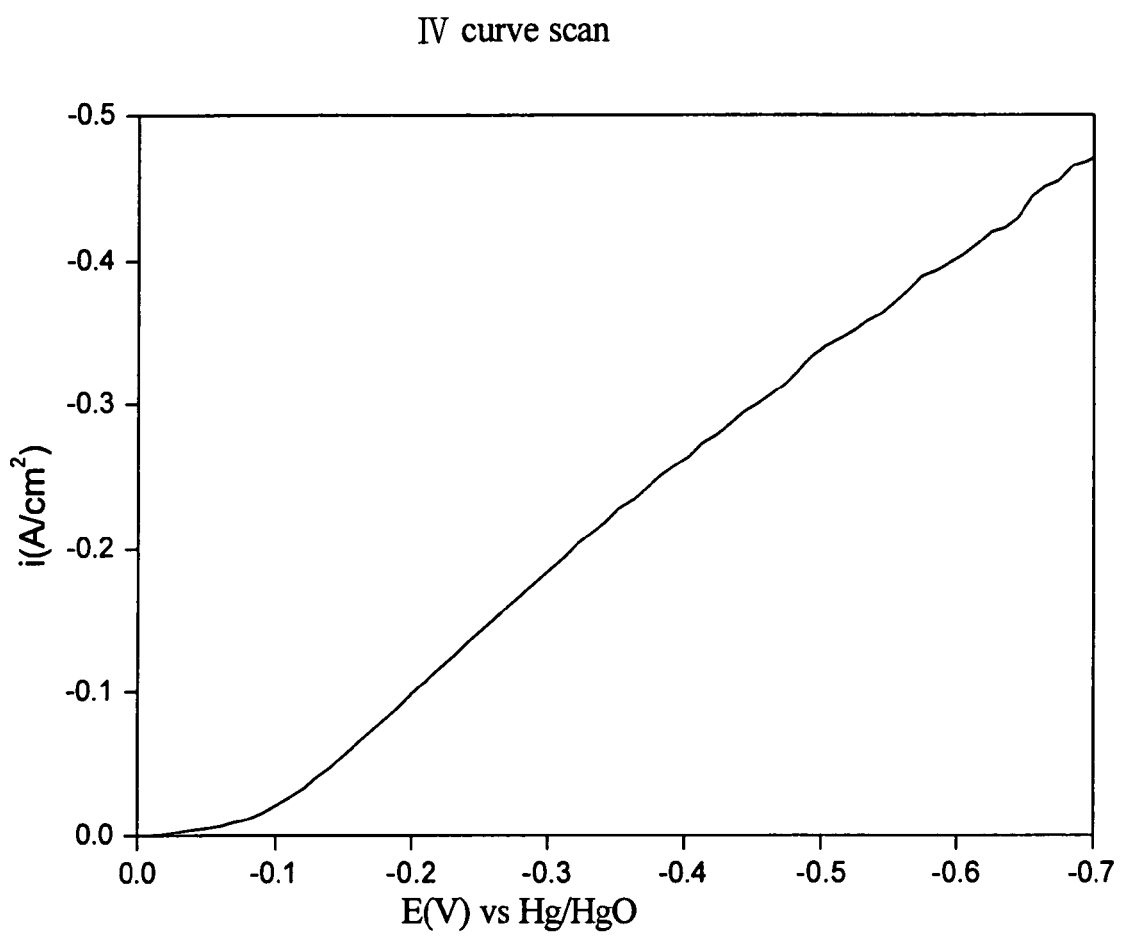
FIG. 4 is a curve diagram illustrating electric property curve of an air cathode of the present invention.

The air cathode 10 made of the method of the embodiment is fastened by a fixture in advance, and KOH aqueous solution then is added, and the Hg/HgO electrode is taken as the reference electrode, and the Pt electrode is taken as the counter electrode, and the electro-chemical analyzer then analyzes the air cathode, thereby obtaining the IV electric property curve as shown in the FIG. 4.

The test result of IV electric property curve shows that the current density of the air cathode 10 of the embodiment achieves above −0.18 A/cm$^2$ when the working voltage corresponding to the Hg/HgO reference electrode is below −0.3V. Therefore, the air cathode 10 of the embodiment can rapidly catalyze the oxygen to undergo the cathode chemical reaction and convert it into hydroxyl ion that passes through the KOH electrolyte to react with the metal anode, thereby generating electric current.

The current density of the conventional air electrode or gas electrode only achieves −0.025 to −0.080 A/cm$^2$, and the current density of the air cathode having one activation layer can achieve −0.3 A/cm$^2$. The current density of the air cathode 10 illustrated in the embodiment can achieve −0.34 A/cm$^2$ when the Hg/HgO reference electrode is below −0.5V.

Moreover, since the conventional air cathode (the three-layer structure composed of two diffusion layers and one activation layer) needs two-time sintering for 60 minutes, the air cathode of the present invention (The five-layer structure composed of two diffusion layers and three activation layers) only needs one time sintering for 30 minutes, thereby saving the production time.

Figure 5:
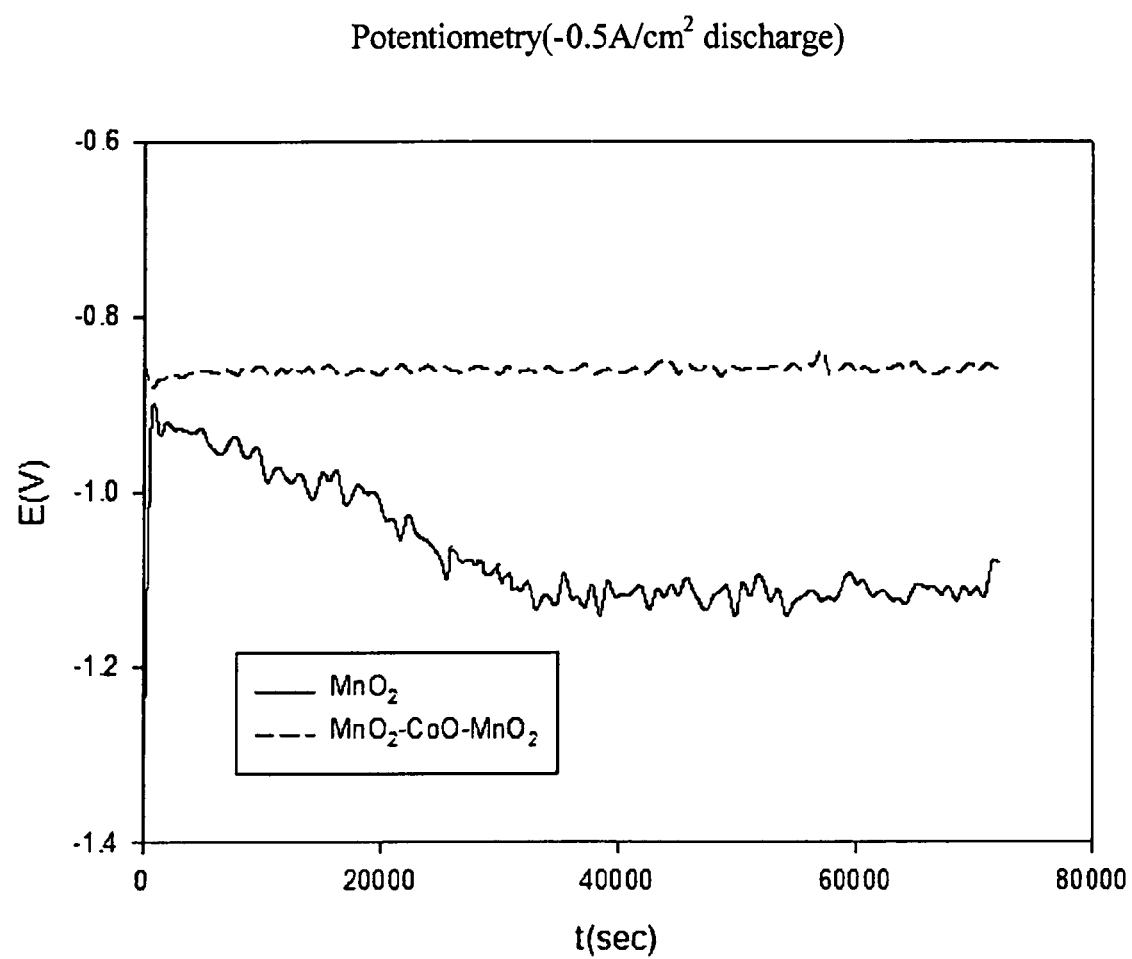
FIG. 5 is a curve diagram illustrating electric property comparison between the conventional air cathode and the air cathode illustrated in the present invention.

Referring to FIG. 5 for the curve diagram illustrating electric analysis for the conventional air cathode and the air cathode illustrated in the present invention. Since both air cathodes are discharged at electric current of −0.5 A/cm$^2$ and go through 72,000 seconds, the air cathode having the three activation layers illustrated in the present invention can maintain stable discharge current at higher voltages; the discharge voltage of the conventional air cathode having the single activation layer may be unstable. When the discharge time increases, the conventional air cathode needs more voltages to keep its discharge current (performance degradation).

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An air cathode having a multilayer structure, comprising:
   at least one substrate;
   two diffusion layers one of said diffusion layers laminated over an upper side of the substrate and the other diffusion layer laminated over a lower side of the substrate; and
   three activation layers respectively laminated over one of the two diffusion layers in order,
   wherein different loadings or different kinds of catalysts are added to a slurry to form each of the activation layers, and the activation layers and the diffusion layers are made through simultaneous sintering, thereby shortening the processing time, and a thickness of the air cathode is between 0.01 and 20 mm, and a density of the air cathode is between 0.01 and 5.0 g/cm$^3$.

2. The air cathode as defined in claim 1, wherein the air cathode is applied to an electrode of a Zinc-Air battery, a fuel cell or a capacitor.

3. The air cathode as defined in claim 1, wherein the substrate is taken as an electrical current collector and comprises of a metal mesh, and the metal mesh includes a metal wire mesh, a metal mesh grid or foam, and a material of the metal mesh includes stainless steel, copper, nickel, copper alloy, nickel alloy, other metals or alloys.

4. The air cathode as defined in claim 1, wherein each of the diffusion layers is made of hydrophobic carbon material and PTFE binder; and the slurry of forming each of the activation layer comprises hydrophilic carbon material, PTFE binder and catalysts mixed with water, methyl alcohol or isopropyl.

5. The air cathode as defined in claim 1, wherein the catalysts are metal oxide or salts selected from manganese, cobalt, nickel and other metals.

6. The air cathode as defined in claim 1, wherein the different loadings of catalysts are to change weights of catalysts coated on the air cathode.

7. The air cathode as defined in claim 1, wherein the different kinds of catalysts are to coat different metal salts or metal oxide on the air cathode.

\* \* \* \* \*